United States Patent [19]

Danilov et al.

[11] Patent Number: 5,103,073

[45] Date of Patent: Apr. 7, 1992

[54] DEVICE FOR LASER TREATMENT OF AN OBJECT

[76] Inventors: Viktor A. Danilov, Frunzenskaya naberezhnaya, 28, kv. 88; Vladimir V. Popov, ulitsa 1905 goda, 4, kv. 20; Alexandr M. Prokhorov, ulitsa Zvenigorodskaya, 14, kv. 10; Iosif N. Sisakian, Leninsky prospekt, 13, kv. 13; Dmitry M. Sagatelian, Smolensky bulvar, 15, kv. 31, all of Moscow; Viktor A. Soifer, ulitsa Pervomaiskaya, 34, kv. 51, Kuibyshev; Elena V. Sisakian, Leninsky prospekt, 13, kv. 13; Leonid P. Naumidi, ulitsa Tikhomirova, 7, korpus 3, kv. 119, both of Moscow; Jury K. Danileiko, ulitsa Solnechnaya, 2, kv. 17, Moskovskaya oblast, Troitsk; Jury D. Terekhin, ulitsa Polyarnaya, 18, kv. 55; Vladimir S. Akopian, 9 Sokolnicheskaya ulitsa, 4, korpus 1, kv. 137, both of Moscow; Sergei P. Murzin, prospekt Karla Marxa, 498, kv. 33, Kuibyshev; Vladimir P. Shorin, prospekt Lenina, 3, kv. 629, Kuibyshev; Vasily I. Mordasov, ulitsa Marii Aveide, 27, kv. 39, Kuibyshev, all of U.S.S.R.

[21] Appl. No.: 350,625
[22] PCT Filed: Aug. 28, 1987
[86] PCT No.: PCT/SU87/00098
§ 371 Date: Apr. 27, 1989
§ 102(e) Date: Apr. 27, 1989
[87] PCT Pub. No.: WO89/01841
PCT Pub. Date: Mar. 9, 1989
[51] Int. Cl.⁵ .................................. B23K 26/00
[52] U.S. Cl. .................. 219/121.68; 219/121.7; 219/121.74; 219/121.76
[58] Field of Search ........... 219/121.6, 121.85, 121.76, 219/121.73, 121.74, 121.75, 121.61, 121.62, 121.7

[56] References Cited

U.S. PATENT DOCUMENTS

| | | | |
|---|---|---|---|
| 4,387,952 | 6/1983 | Slusher | 219/121.8 X |
| 4,424,435 | 1/1984 | Barnes, Jr. | 219/121.64 |
| 4,475,027 | 10/1984 | Pressley | 219/121.6 |
| 4,561,436 | 12/1985 | Munnerlyn | 219/121.74 X |
| 4,564,739 | 1/1986 | Mattelin | 219/121.77 X |

FOREIGN PATENT DOCUMENTS 3600591 7/1986 Fed. Rep. of Germany .

OTHER PUBLICATIONS

V. P. Veiko et al., Lazernaya Obrobotka, 1973, Lenizdat Publ., Leningrad, pp. 144 & 136.

Lazernaya i Elektronno-Luchevaya Obrabotka Materialov, Reference book, N. N. Raykalin et al., 1983, pp. 445–449.

Elektronaya Promyshlennost, Issue 1, 1976, Moscow, V. Z. Vysotsky et al., Ustanovka S Proektsionnoi Opticheskoi Sistemoi dlia Podgonki Resistorov, pp. 22,23.

Primary Examiner—C. L. Albritton
Attorney, Agent, or Firm—Lilling and Lilling

[57] ABSTRACT

This invention relates to industrial physics and, in particular, to methods of laser treatment. The laser treatment method consists of irradiation of the surface of an object by laser beams directed to treatment zones having a desired shape, wherein laser beams are subjected to spatial phase modulation dictated by the shape of the treatment zone and the prescribed distribution of intensity and are, simultaneously, rotated.

A device realizing this method comprises a source of laser radiation with an optical system for delivery of laser radiation to the object, which is positioned on the optical axis of the source and includes at least one phase computer-designed element made as a reflecting or transmitting plate with a micropattern on the surface thereof, which is dependent on the shape of the treatment zone, distribution of laser radiation intensity, and its wavelength ($\lambda$), the height (h) of the peaks of the micropattern varying, from the base (a) to the top (b), from 0 to $\lambda/2$ for the reflecting plate and from 0 to $\lambda/(n-1)$ for the transmitting plate, where n is the refractive index of the transmitting plate.

6 Claims, 6 Drawing Sheets

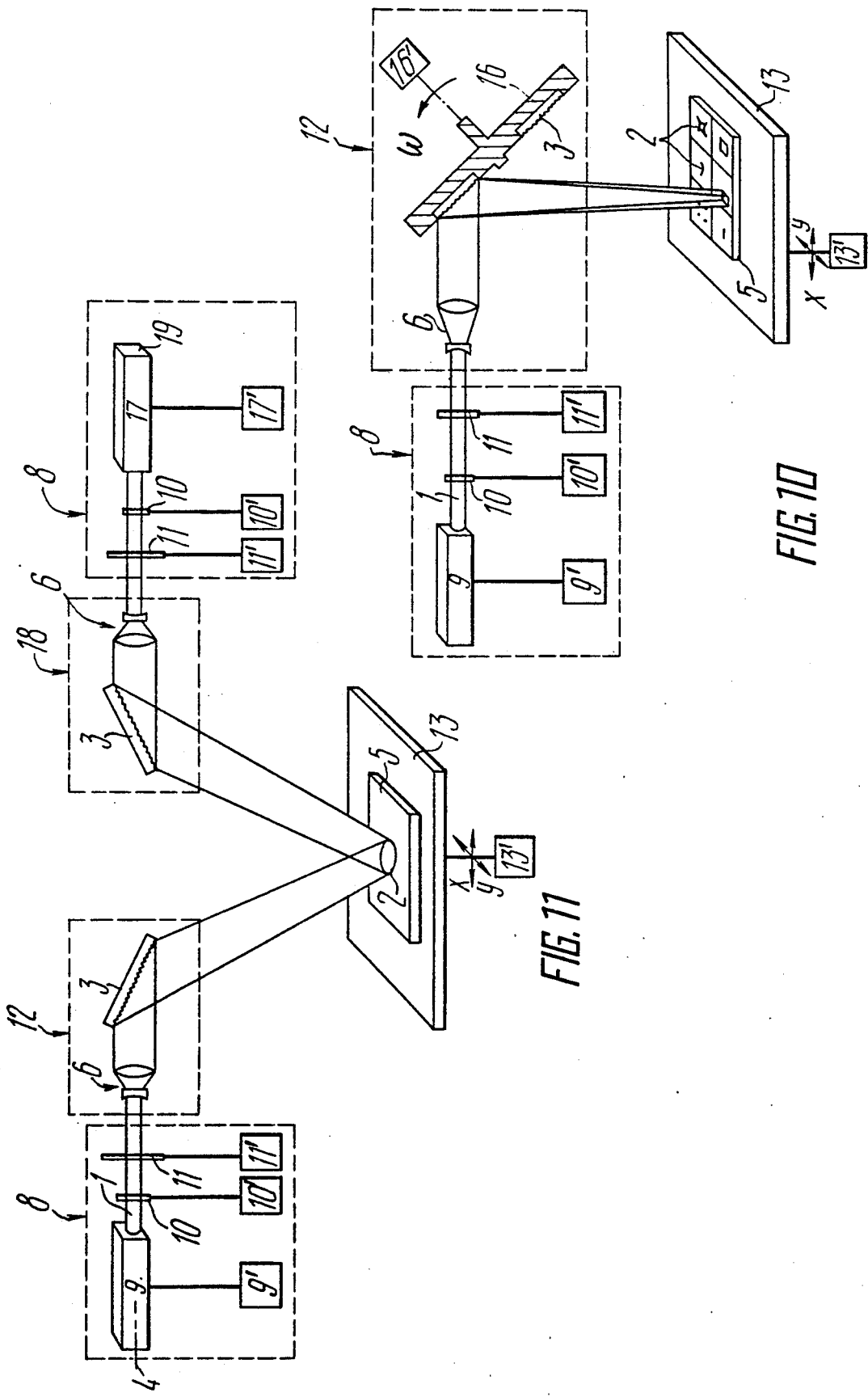

DEVICE FOR LASER TREATMENT OF AN OBJECT

BACKGROUND OF THE INVENTION

1. Field of the Invention

This invention relates to industrial physics and, in particular, to laser technology and machinery and, more particularly, to a method of laser treatment of an object and a device realizing this method.

2. Description of the Related Art

At present laser beams are used in many fields of science and technology, in industry and medicine to irradiate a specific zone on an object by a specific distribution of density of the laser flux in order to achieve an energy input for some sort of treatment. This problem is more or less effectively dealt with by several known methods of laser treatment using many different optical laser systems. But it should be admitted that potentialities of laser beams in treatment of various materials are far from being fully exploited. Since lasers are not cheap to use, each method and device is to be assessed on the basis of efficiency achieved in the application of lasers which are the basic component of such methods and devices.

Laser technologies can be classified according to the shape of the treatment zone into three types:

spot laser treatment—piercing blind and through holes, for example, spot welding;

straight line laser treatment—welding, cutting, scribing;

laser treatment of intricately-shaped patterns—heat treatment, lithography or printing, patterning.

The last and most complicated method of treatment of patterns consists in that, first, the optical system produces a laser beam in accordance with the required shape and size of the treatment zone (optical image production stage), and, second, a specific energy input is applied to this treatment zone (transmission of optical image to the object). The shape and size of the treatment zone are dictated by specific requirements of a production operation.

Several methods are used to produce an optical image for laser treatment of various objects. More popular are a contour-beam method and a mask method including contact and projection varieties.

Known in the art is a contour-beam method of laser treatment of an object (V. P. Veiko et al. Lazernaya Obrabotka, 1973, Lenizdat Publ., Leningrad, p. 144), wherein an optical image of a pattern is produced within a specific exposure period by successively illuminating a specific profile or contour by a light beam focused by an objective lens. The assigned contour is traced either by moving the object or by scanning the light beam. The object is usually placed in the focal plane of the objective lens and scanning is performed by mechanical transportation of the optical system of the device. It is important in this method that the optical system be equipped with at least one lens focusing radiation to a point and with a means for relative movement of the laser beam and the object.

This prior art method has the advantage of efficient use of laser energy. It is also good because it can achieve a high density of the energy flux in a spot area. But this method is deficient in that it is much less efficient in producing intricately shaped patterns because the whole treatment zone cannot be exposed at once. Besides, this method provides no optical means for producing a specific distribution of laser beam density in the treatment zone. These drawbacks restrict the range of production operations realizable by this method. If the treatment zone is not an outline or contour but a limited surface, this method cannot provide high quality of laser treatment.

Known in the art is a mask laser treatment method (V. P. Veiko et al., Lazernaya Obrabotka, 1973, Lenizdat Publ., Leningrad, p. 136), in which a laser beam of a specific shape and size is produced by irradiating areas on the surface of an object through masks (stencils) installed in the optical system of the device realizing this method. Free spaces or slots in the mask correspond to the required shape of the treatment zone, while the size can be left unaltered, reduced or magnified to a required size by the optical system. Two varieties of this method, contact and projection methods, have become popular recently.

The contact method consists in that a mask is pressed against the object prior to exposure. The advantage of this method consists in that the optical system of the device realizing this method is uncomplicated. But this method of laser treatment is deficient in that the object may be mechanically damaged when the mask is pressed thereto. On the other hand, if the mask is not intimately mated with the surface of the object, the quality of laser treatment is affected by diffraction distortions. Besides, the mask should be wear-resistant and immune to laser emission as compared to the material to be treated.

In the projection method the mask illuminated by the laser beam features slots corresponding to the desired shape of the treatment zone. The projection lens is used to demagnify the mask image to a desired size. The focal plane of the lens is matched with the surface of the object to be treated. There are several optical configurations employed in the projection method and, respectively, several different devices realizing this method (Lazernaya i Elektronno-Luchevaya Obrabotka Materialov, Reference book, N. N. Rykalin et al. 1983, pp. 445–449). This reference book also cites parameters of lasers to be used for laser treatment and industrial laser installations.

Mask laser treatment methods, both contact and projection ones, are deficient in that a large amount of laser energy is lost on non-transparent portions of the mask. Such methods cannot provide a desired distribution of laser radiation density over the entire zone of treatment.

Commonly known are combination methods where projection and contour techniques are used at the same time. In this case, the projecting optical system produces a reduced mask image in the focal plane of the objective lens, while scanners produce an optical image of the desired pattern in the conventional successive manner.

Known in the art is a device realizing a projection method of laser treatment of objects or materials (Elektronnaya Promyshlennost, Issue 1, 1976, Moscow, V. Z. Vysotsky et al., Ustanovka s Proektsionnoi Opticheskoi Sistemoi dlia Podgonki Resistorov, pp. 22–23) and intended for adjustment of parameters of passive components of integrated circuits. This prior art device comprises a laser radiation source and an optical system for delivery of laser radiation to the object to be treated, which is arranged on the optical axis of the laser radiation source. The manufacturing process of resistor adjustment consists in removing excess portions of resistive film stripes by evaporation of the material to a desired size by laser emission. For this purpose, the optical system of the device produces a laser beam spot in the desired plane as a 7-10 mm long and 1 mm wide straight line, the radiation density being distributed uniformly both in length and width. The device is equipped with a laser operating in a Q-switched mode at a wavelength of 1.06 micrometers. The output laser beam is focused by a positive lens to a cylindrical lens of the optical system, which is placed directly before the objective lens. A mask featuring a slot of a desired shape is placed behind the cylindrical lens. The generator of the cylindrical lens is oriented perpendicular to the slot so that the edges thereof are reproduced without distortion by a high-resolution objective lens. The plane of line images oriented across the slot is located outside the treatment zone and, consequently, the distribution of the laser beam density within the slot image is relatively uniform, slowly declining from the center towards the edges. The cutting length is restricted by the area of uniform energy density distribution by means of a special-purpose diaphragm located near the surface being treated.

This device is another striking example of the type of problems encountered when conventional optical elements are used to produce a desired shape of the treatment zone (a narrow strip, in this case) with a specific distribution of laser emission density (uniform, in this case) and maximum utilization of the radiated power. The optical system is inevitably overcomplicated and requires precision adjustment. Radiated power is inevitably lost on the mask.

Each known method of laser treatment of objects and devices realizing these methods have their merits and deficiencies, and their own fields of application. But there is no doubt that no existing method of laser treatment of specific patterns on objects and no existing device realizing this method can provide a combination of two functional capabilities such as a specific distribution of density of radiated power and concentration of the laser beam power within a treatment zone having a specific shape.

SUMMARY OF THE INVENTION

It is an object of this invention to expand the range of production operations realized by the proposed method of laser treatment, to improve the utilization factor of radiated power, to achieve higher efficiency and improve the reliability of the laser treatment process, and to improve the quality of laser treatment and its accuracy.

This object is achieved by a method of laser treatment of an object by irradiation of the surface thereof by at least one laser beam directed to treatment zones of specific shapes. According to the invention, the laser beam is subjected to spacial phase modulation realized in conformity with the desired distribution of radiation intensity in a treatment zone and accompanied by a simultaneous turn of the optical axis of the laser beam.

It is advisable that in the method of laser treatment of objects, according to the invention, the laser beam which had been subjected to the spacial phase modulation should be rotated about its optical axis.

It is also advisable that in a method of laser treatment of objects, wherein the object is treated by at least one beam of invisible laser radiation, according to the invention, the invisible laser beam should be directed to zones of treatment on the surface of the object by a visible laser beam having the same distribution of radiation intensity.

The object of the invention is also achieved by a device realizing the method of laser treatment of objects, comprising a laser radiation source and an optical system for delivering laser radiation to the object, which is arranged on the optical axis of the laser radiation source. According to the invention, said optical system comprises at least one phase element of computer optics, ensuring rotation of the laser beam, its spacial phase modulation, and redistribution of its power over the treatment zone having a desired shape, said computer-designed optical element being made as a reflecting or transmitting plate whose surface micropattern is dictated by the desired shape of the treatment zone, by the distribution of radiated intensity, and by the wavelength of laser radiation, the height of the micropattern peaks ranging, from the peak base to its top, from 0 to $\lambda/2$ for a reflecting plate and from 0 to $\lambda/(n-1)$ for a transmitting plate, where n is the refractive index of the material of the transmitting plate.

It is admissible that in the proposed device, according to the invention, the radiation source should comprise two lasers, one laser generating invisible radiation and the other laser generating visible radiation, a second optical system being provided on the optical axis of the second laser and comprising at least one computer-designed phase element in order to produce a visible image of a desired shape, which is optically matched with the invisible image in the treatment zone.

It is advisable that the proposed device, according to the invention, should comprise a means for shifting the computer-designed phase element in relation to the optical axis of the laser radiation source.

It is convenient that the proposed device, according to the invention, should comprise a set of computer-designed phase elements installed in the means for shifting and locking said elements.

The herein disclosed invention makes it possible to expand the range of production operations performed by laser treatment of materials and to achieve a higher utilization factor of laser radiation by providing flexible control of geometrical characteristics of laser beams in zones of treatment on the surface of objects, while retaining radiated power and ensuring desired distribution of the laser beam density. This invention provides a more reliable laser treatment method characterized by high reproducibility when dealing with intricately shaped zones, and higher efficiency by cutting down the time for complex production operations. Moreover, parameters of production processes can be optimized more easily, laser treatment becomes more accurate, the number of optical elements in the optical system for delivery of laser radiation to the object to be treated is reduced, and the device becomes more reliable and compact.

The proposed method can be easily combined with other laser treatment methods. The range of production operations can be broadened. The process of laser treatment of materials can be easily automated, making this treatment more reliable and efficient.

BRIEF DESCRIPTION OF DRAWINGS

These and other advantages of the present invention will become more apparent from the following description of preferred embodiments of the invention, taken in conjunction with the accompanying drawings wherein:

FIG. 10 shows a block diagram of a device realizing the laser treatment method applicable to a plurality of treatment zones, according to the invention;

FIG. 11 shows a block diagram of a device realizing a laser treatment method wherein invisible laser radiation is directed to the treatment zone, according to the invention;

DESCRIPTION OF THE PREFERRED EMBODIMENTS

The new laser treatment method has been developed with a practical target in view—what is the most expedient way to make use of the potentialities of existing lasers in order to cope with various technological problems in the field of treatment of materials.

The laser beams are usually round or rectangular in cross-section, while the energy input (thermal or thermochemical) is to be applied to an object in treatment zones having various intricate shapes and patterns. Distribution of radiation intensity over the laser beam cross-section is dictated by the laser design, while heat fields having specific configurations should be provided in the treatment zone in conformity with a particular technology. The laser beam propagates along a straight line, while the treatment zone may be situated in a hard-to-get location. Many technological problems can be solved if laser radiation with intensity distributed in accordance with specific requirements over the treatment zone having a specific shape is applied to this zone in a plane required for treatment. The object should desirably be placed conviniently in relation to the laser radiation source. It is also desirable that the dimensions of the optical system used to deliver laser radiation to the object of treatment are not too large because of the auxiliary optical appliances and elements provided in the system.

The new laser treatment method is focused to achieve the main target—to produce, in the treatment zone, a spot of laser radiation, visible and invisible, as a pattern or an area having a specific distribution of radiation density or laser power within this spot. The method is to be fast, uncomplicated, reliable and economical in terms of low power losses. Moreover, the laser beam is to be directed to the treatment zone at a specific angle without resorting to additional optical elements installed in the system for delivery of laser radiation to the object of treatment.

This has been achieved by providing a novel, in the field of laser treatment, method of producing an optical image of a treatment zone. This novel method may be categorized into two variations: static and dynamic.

Figure 1:
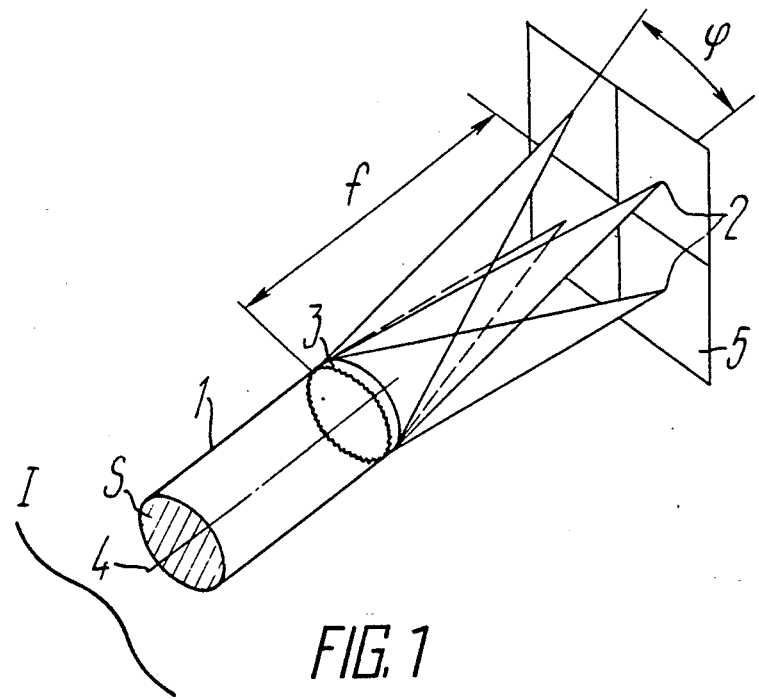
FIG. 1 shows a schematic of a static variation of a method for producing an optical image of a treatment zone having a specific distribution of radiation intensity hereover, according to the invention.

The static method of producing an optical image of a treatment zone uses spacial modulation of laser beams 1 (FIG. 1), which is dictated by the assigned shape of a treatment zone 2 and the assigned distribution I' of laser radiation intensity within this zone 2 (PCT/SU 85/00037; CA, A, 488092). The spacial phase modulation transforms the laser beam having a round or rectangular cross-section S and an initial distribution I of laser radiation intensity over the beam cross-section so that the size of the beam cross-section S is reduced to S' (focusing process) and the shape of the cross-section 3 of the laser beam 1 is altered to become the assigned shape. Simultaneously, the intensity distribution over the cross-section S is redistributed from I to I' and, consequently, the laser radiation intensity distribution in a specific period of time is also altered.

The spacial phase modulation of laser beams 1 is effected by computer-designed phase elements 3 capable of concurrently turning the laser beam 1 which had been propagating along an optical axis 4 to an angle $\phi$ (PCT/SU 85/00037; CA, A, 488092).

Figure 13:
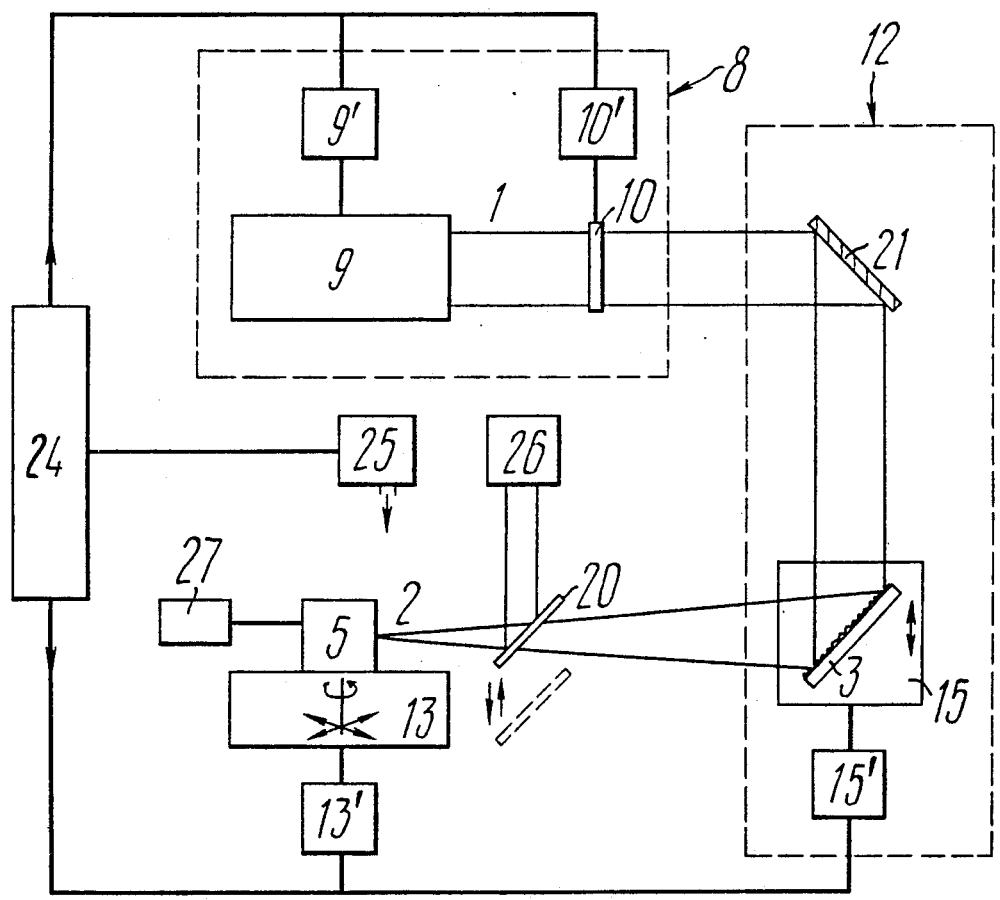
FIG. 13 shows a skeleton diagram of a device equipped with automatic control, according to the invention.

This method permits instantaneous production of an image of the treatment zone 2 having a specific shape and a specific radiation intensity distribution I' in the focal plane of the computer-designed phase element 3 at a distance f (FIG. 2) from this element 3. This image may be located outside (FIG. 13) or on (FIG. 2) the optical axis 4 of the initial laser beam 1. The surface of an object 5 is made to agree with the focal plane of the computer-designed phase element 3. Then the object 5 is irradiated by the laser beam. The image is transmitted to the object 5 by the process of power input of the laser beam 1 to the material of the object 5.

Figure 2:
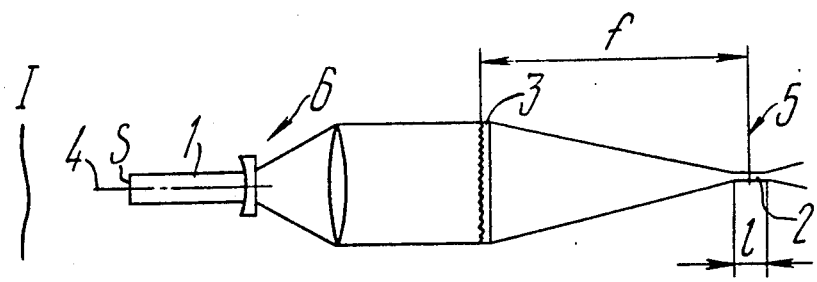
FIG. 2 shows a lateral view of the schematic of FIG. 1, according to the invention.

In some cases, to improve the quality of the image and, consequently, of the laser treatment, the laser beam 1 has to be broadened by a telescope 6 (FIG. 2). The laser beam spread after the telescope 6 is negligible. This is particularly important when the laser beam 1 is focused into a narrow cylinder arranged along the optical axis 4 thereof, whose length is equal to the length "l" of the caustic of the computer-designed phase element 3.

This method is extremely effective when the treatment zone 2 has dimensions comparable with the size of the laser beam 1. When treatment zones 2 are especially small, the image produced by the computer-designed phase element 3 can be demagnified by a projection lens.

When dimensions of the treatment zones 2 are significantly larger than the size of the laser beam 1, the other, dynamic, variation of the method for producing an optical image of the treatment zone 2 should be used.

Figure 4:
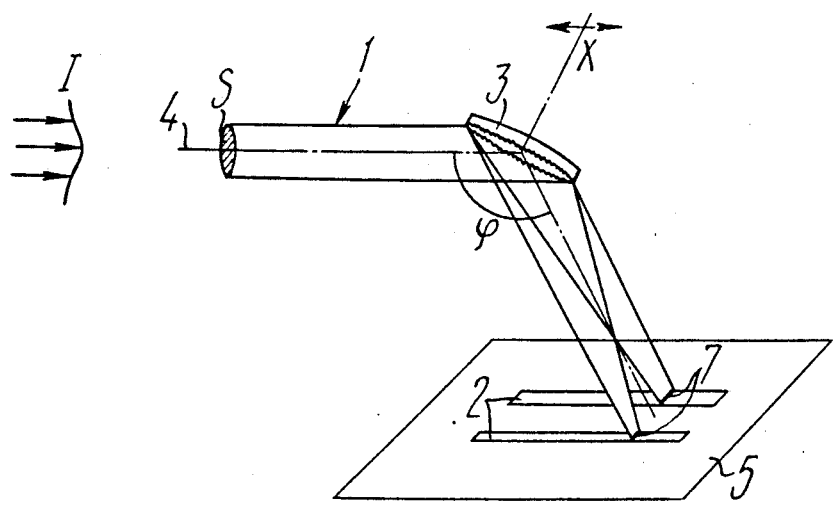
FIG. 4 shows a schematic of a dynamic variation of a method for producing an optical image of a treatment zone having a specific shape with a specific distribution of radiation intensity over this zone, wherein a computer-designed phase element is transported forward along the laser beam axis, according to the invention.
Figure 5:
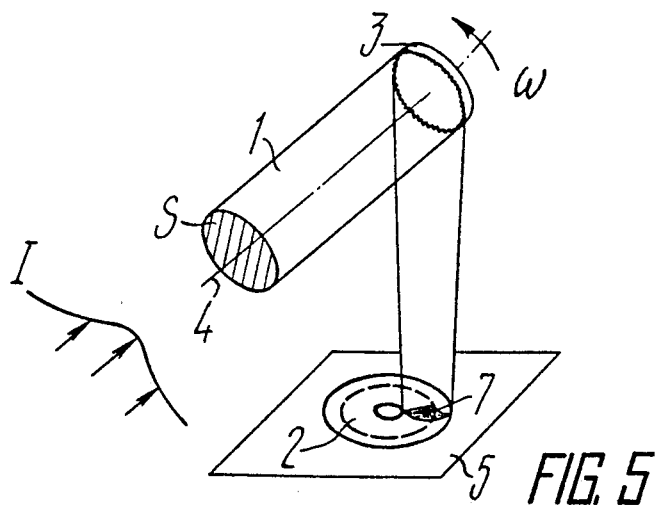
FIG. 5 shows the view of FIG. 4 wherein the computer-designed phase element is rotated, according to the invention.

The dynamic variation of the method consists in that a complete optical image of the treatment zone 2 (FIGS. 4 and 5) is synthesized within the exposure period of successive irradiation of the treatment zone 2 having a specific shape and size by the laser beam 1 spacially modified, in advance, by a computer-designed phase element 3. To this end, the object 5 and the spacially-modified laser beam 1 should be displaced in relation to each other. This is achieved by altering the position in space of either the computer-designed phase element 3 (FIGS. 4 and 5) as proposed in this invention, or the object 5 of treatment. FIGS. 4 and 5 show variations of the method, wherein the computer-designed phase element 3 is transported along the optical axis 4 of the laser beam 1 at a velocity V or is rotated about its own axis at a speed $\omega$, respectively.

This method provides for successive composition of an image of the treatment zone 2 having desired shape and size from individual components 7 of this zone 2, the shape of such components 7 being the basis for desiging phase elements 3. This laser treatment method has a much broader field of application. The radiation intensity distribution I' can be controlled within each individual component 7 of the treatment zone 2, as well as the shape of this zone 2, and the speed V of linear travel or the speed $\omega$ of rotation of the computer-designed phase element 3 and/or the object can be varied in time $V=V(t)$ and $\omega=\omega(t)$. These capabilities offer the advantage of performing technological operations over a wide surface which are impossible or very complicated to realize by any other laser treatment methods.

The laser treatment method will now be described with reference to a simpliest possible device realizing this method. This device is equipped with a laser radiation source 8 (FIG. 6) comprising a laser 9, a power supply unit $9^I$, a beam shutter 10 with an electrical control unit $10^I$, and a laser radiation chopper 11 with a control unit $11^I$. An optical system 12 for delivering laser radiation to the object 5 is arranged on the optical axis 4 of the source 8. The optical system 12 comprises at least one computer-designed phase element 3. In case the laser beam is to be spread, the optical system 12 should comprise a collimating telescope 6. The object 5 of treatment is placed on a work table 13.

Figure 3:
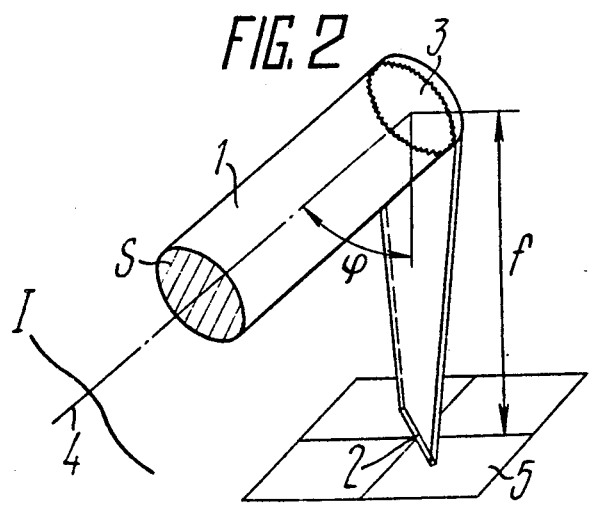
FIG. 3 shows the same schematic wherein the laser beam is turned to a certain angle, according to the invention.
Figure 7:
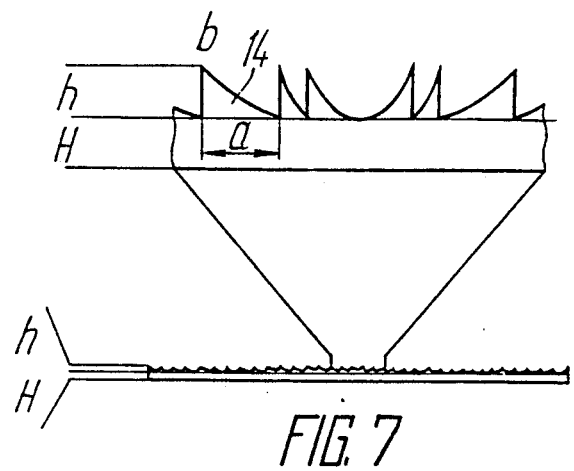
FIG. 7 shows schematic of a lateral view of a computer-designed phase element, according to the invention.
Figure 8:
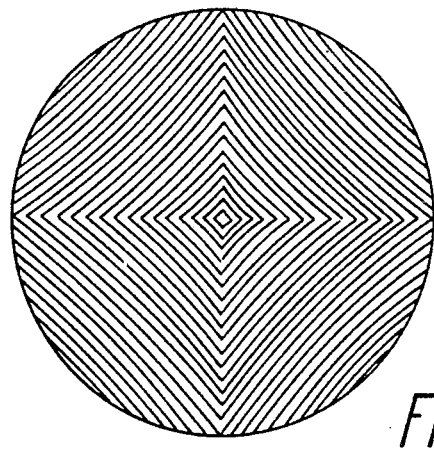
FIG. 8 shows a top view of the schematic of FIG. 7, according to the invention.

The computer-designed phase element 3 (FIGS. 7 and 8) is a plate reflecting or transmitting laser radiation. The microrelief pattern of the plate surface is dictated by the shape of the treatment zone 2 (FIG. 6), distribution I' of laser radiation intensity within this zone 2, and the laser radiation wavelength $\lambda$. Each peak 14 (FIG. 7) of the micropattern is, in its cross-section, a tooth with one vertical side. The other side of the peak 14 is smoothly varying within the height h from the base with a width a to the top b. The arrangement of the peaks 14 above the surface of the plate with a thickness H is computer-designed in an extremely intricate configuration (FIG. 8). The device may be provided with computer-designed phase optical elements 3 of two types—reflecting and transmitting laser radiation. A reflecting plate is either an all-metal plate or a metal plate with a reflective coating applied over the micropattern. In both types peaks 14 of the micropattern have the height h changing from the base "a" to the top "b" within the range from 0 to $\lambda/2$. A transmitting plate is made from a material transparent for laser radiation and the peaks 14 of the micropattern have the height h ranging from the base "a" to its top "b" within the range from 0 to $\lambda/(n-1)$, where n is the index of refraction of the material of the plate. The computer-designed optical phase element 3 diverts the laser beam 1 to an angle $\phi$ (FIG. 3) and subjects it to spacial phase modulation so that in the treatment zone 2 the cross-section of the beam 1 has a desired shape and desired distribution of radiation intensity within this treatment zone 2. In practical terms, almost all power of the laser beam is directed to the treatment zone 2 in this case.

The device is to perform various technological operations based on thermal effect of infrared laser emission, such as piercing of intricately shaped holes, piercing of plurality of holes, marking, application of decorative patterns on different materials, e.g. acrylic plastic, rubber.

The device realizing the laser treatment method proposed herein operates as follows.

Figure 6:
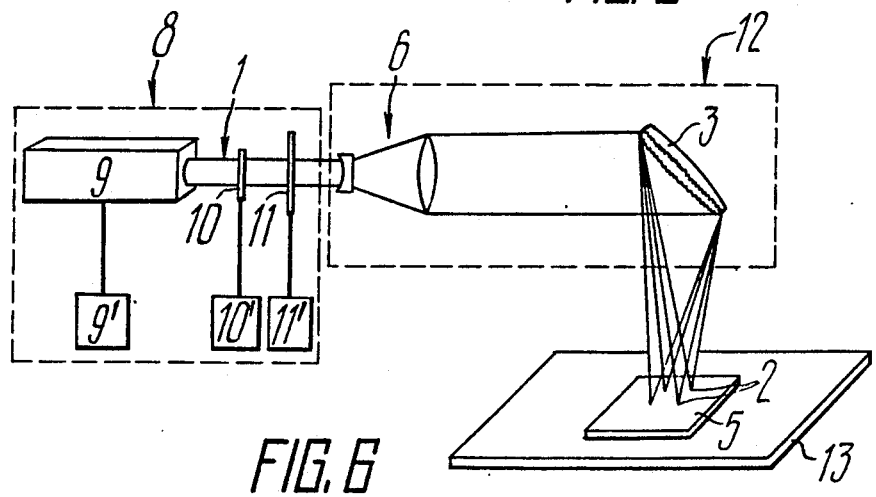
FIG. 6 shows a block diagram of a device realizing the method for laser treatment of an object, according to the invention.

A computer-designed phase element 3 is placed into an optical system 12 (FIG. 6). The phase element 3 is a reflecting plate and is adjusted so that an image of the treatment zone 2 having a desired shape is produced in the working position. The object 5 of treatment (workpiece) is secured on the work table 13 in the work position in which the surface of the object 5 is made to agree with the surface of the image of the treatment zone 2. The chopper 11 is switched on by means of the control unit $11^I$ to operate in a desired mode. The control unit $10^I$ is used to open the laser beam shutter 10, and the treatment zone 2 on the surface of the object 5 is irradiated for a desired period of time. The device may not be equipped with the beam chopper 11. In this case the duration of exposure is regulated by the shutter 10 provided with a time relay (timer).

EXAMPLE 1

The source 8 (FIG. 6) is a $CO_2$ continuous laser 9 with an output power of 100 W, operating on the wavelength $\lambda=10.6$ micrometers. Laser power and exposure were controlled by the chopper 11 and the electromechanical shutter 10. The laser beam 1 had a round cross-section S with Gaussian distribution of radiation intensity over this cross-section. The laser beam 1 was spread by the telescope 6 and directed to the computer-designed phase optical element 3 made as a copper 2 mm thick plate with a microrelief pattern provided on its surface as described above. The height of micropattern peaks 14 was $h_{max}=\lambda/2=5.3$ micrometers. Individual computer-designed optical elements 3 were selected for each operation in particular.

Some conclusions drawn from the operation of this device are listed below.

Piercing of multiple holes in non-metallic thin sheets. The best effect is achieved by a computer-desingned optical element 3 which transforms the laser beam 1 so that it is separated into four portions, each being focused into a spot in the treatment zone 2. The holes thus made were identical in shape, the distance between holes was extremely precise. In this manner, the efficiency of treatment, its quality and accuracy were improved.

Scribing of slots in thin absorbing plates. The best effect was achieved by a computer-designed optical phase element 3 which transforms the laser beam 1 so that in the treatment zone 2 the laser beam is focused into a portion of a straight line, 8 mm long and 0.4 mm thick, with uniform distribution I' throughout the length of the line. The plate was split along the irradiated line during one exposure. High level of reproducibility of this operation practically eliminated spoilage of the products.

Application of ornamental patterns. The computer-designed optical phase element 3 focused the laser beam 1 to a spot of a complex shape. This is an example of how a complex pattern can be transmitted to the object 5 by one pulse without any loss of laser power. Besides, latters and digits were applied on products as markings.

The laser treatment method can also be realized by a device comprising a laser radiation source 8 (FIG. 9) and an optical system 12 for delivery of laser radiation to the object 5 of treatment, which is arranged on the optical axis 4 of the source 8 and comprises at least one computer-designed optical phase element 3. The device also comprises a control unit $13^I$ of the work table 13 and a means 15 with a control unit $15^I$ which is to control the position of the phase element 3 in relation to the optical axis 4 thereof during exposure. In particular, for treatment of large-size workpieces, the work table 13 may be made as a two-axis positioning table with mounting attachments, which is used in laser NC machines (N. N. Rykalin et al., Lazernaya i Elektronno-Luchevaya Obrabotka Materialov, Reference book, 1985, p. 469).

Figure 9:
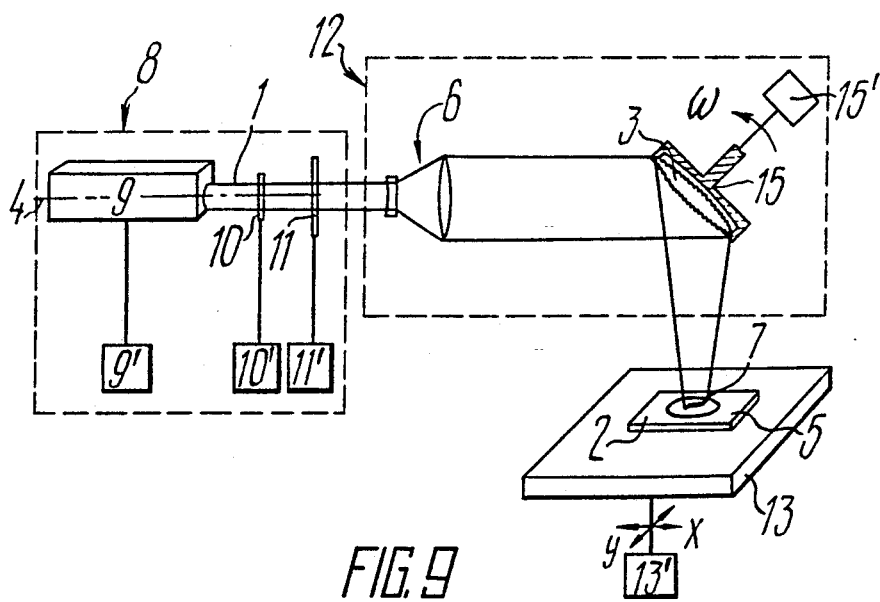
FIG. 9 shows a block diagram of a device realizing the method for laser treatment of objects, wherein a spacially modified laser beam performs controlled motions within the treatment zone, according to the invention.

The means 15 is used to position the computer-designed optical phase element 3 which can travel either along the optical axis 4 of the laser beam 1 at a velocity V or rotate about its axis at a speed $\omega$ (FIG. 9). The means 15 may be a standard detachable head with fixturings and a motor to rotate this head during exposure (not shown in the drawing). In this case, the weight of movable units is minimized to provide easier control of the computer-designed optical phase element 3 and improve the accuracy of treatment.

EXAMPLE 2

The device of FIG. 9 was used for heat treatment of metal workpieces, including hardening, annealing, welding, cutting and the like. The source 8 was a $CO_2$ continuous multimode laser with an output power of 0.9 kW operating at a wavelength $\lambda = 10.6$ micrometers. The intensity I was non-uniformly distributed over the cross-section S of the laser beam 1 having a diameter of 45 mm. The optical system 12 for delivering laser radiation to the object or workpiece 5 comprises a reflecting computer-designed optical phase element 3 made as a copper plate provided with a micropattern on the side facing the workpiece 5 and a heat exchanger on the opposite side thereof. The phase element 3 can be rotated about an axis perpendicular to the plane thereof by a means 15 at a speed $\omega = 5$ rad/min. The workpiece 5 can be transported at a velocity V ~ 1 mm/min on a coordinate table 13 controlled by a unit $13^I$ provided therefor.

Let us now deal with an operation of local softening of a workpiece (sheet material) by intense heating prior to the further operation of bending. The treatment object, a sheet workpiece made of an aluminum alloy, 0.8 mm thick. The computer-designed optical phase element 3 has a focal distance of f = 800 mm and transforms the initial laser beam 1 so that a spot is produced on the surface of the workpiece 5 shaped as a narrow rectangle, 8 by 2 mm, which is used as an individual component 7 of the treatment zone 2. When the phase element 3 is rotated this spot moves over the surface of the workpiece 5 successively covering the entire treatment zone 2 having a round shape during the exposure period. In case the treatment zone 2 is a long strip, the workpiece 5 is transported so that the zone is exposed to the laser beam 1 which had been subjected to spacial phase modulation. In this case a strip of the desired length and width is softened on the workpiece.

When the flat workpiece which had been softened by the laser beam was bent, an L-shaped section was obtained with dimensions $40 \times 60 \times 200$ mm and a radius of curvature of approximately 0.8 mm, increasing to about 3 mm to the ends of the workpiece. Local softening permits a two- or even three-fold reduction of the bending force, higher formability of the material, a 50 percent lower labor input due to elimination of finishing operations, lesser power consumption due to using low-power fast-speed pressing equipment, lower cost of stamping attachments due to elimination of adjustment operations, and more accurate bending.

The laser treatment method can be realized in a plurality of treatment zones 2 (FIG. 10). In this case, each zone 2 is irradiated successively by laser beams 1. Each treatment zone 2 is irradiated by means of a particular spacial phase modulation of the laser beam, effected in conformity with the desired distribution I' of laser intensity. The shape of the treatment zone 2 may vary. This is achieved by the device realizing this embodiment of the proposed method which comprises a set of computer-designed optical phase elements 3, each such element being secured in a device 16 intended for replacement (transportation) and positioning of elements 3.

Successive change of computer-designed optical phase elements 3 can be realized by different embodiments of the device 16, whose alteration and fixing is controlled by a unit $16^I$. This device 16 may be made as a drum or turret head of a conveyer type. The simplest variant of the device 16 is a disk with fixturings, six phase elements 3 being secured in the plane of this disk. These computer-designed optical phase elements 3 are reflecting plates. The disk is set into rotation by a bi-directional low-speed motor. When a particular phase element 3 is placed into a work position, it is clamped in this position.

The use of such device 16 ensures higher efficiency of laser treatment by cutting down the time for installing and replacing each phase element 3. This is particularly true when the laser treatment process is automated.

The laser treatment method can also be realized by a device comprising a laser radiation source 8 (FIG. 11) composed of two lasers 9 and 17 featuring power supply units $9^I$ and $17^I$ respectively. A first optical system 12 is placed on the optical axis 4 of the first laser 9 emitting invisible laser beams 1 intended for power input to the treatment object 5. A second optical system 18 is placed on an optical axis 19 of the second laser 17 emitting visible radiation.

The optical (power) system 12 produces, by means of a computer-designed optical phase element 3, an invisible image of a treatment zone 2 having a desired shape and with a desired distribution I' of laser radiation intensity over this zone 2. The guiding optical system 18 produces, by means of a computer-designed optical phase element 3 of its own, a visible image of the treatment zone, having the same shape and size. These images are matched at the stage of preliminary adjustment before the laser treatment process is started. The surface of the workpiece 5 is placed in the plane of the integrated images, when only the visible low-power radiation is available in this plane to visualize the treatment zone 2. After that the shutter 10 of the first laser 9 is opened and the treatment zone 2 is irradiated. In this manner, invisible laser beams 1 performing the treatment are guided to the treatment zones 2 on the surface of the workpiece 3 with the aid of visible laser beams having the same intensity distribution.

This method permits precision laser treatment of many varieties of workpieces 5, e.g. biological. The laser installation (FIG. 12) described below is designed for microsurgery of eyes, particularly for dissection of the eye cornea in the shape of a ring, cross, or arc.

In this case the device is similar to that shown in FIG. 11. Here the optical systems 12 and 18 (FIG. 12) comprise telescopes 6 installed at the input thereof. Besides, a partially transparent beam splitter plate 20, tilting mirrors 21 and 22, and an ophtalmoscope 23 are installed in the optical system 18 after the phase element 3 made as a transmitting plate.

Figure 12:
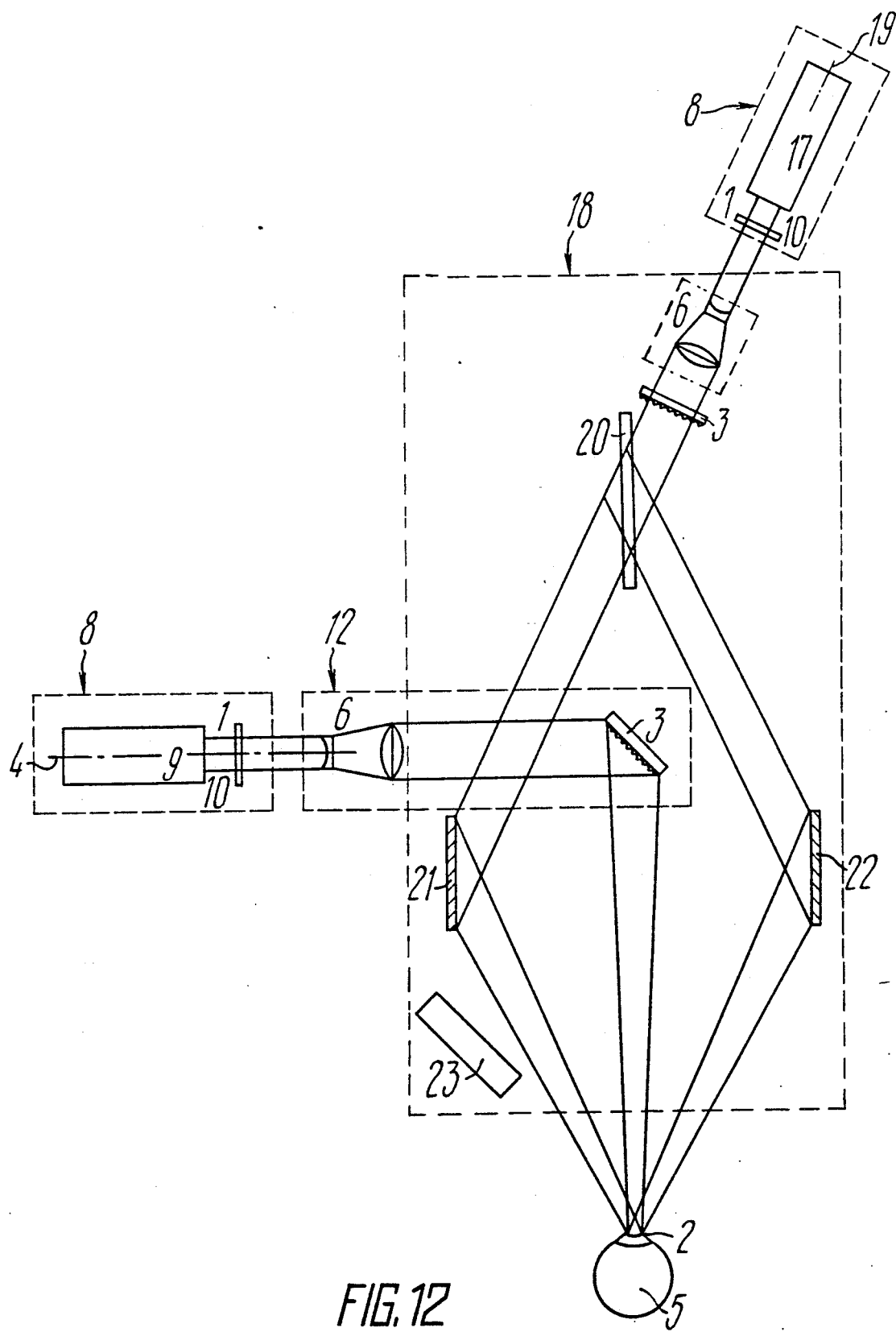
FIG. 12 shows a skeleton diagram of a device used for ophtalmological operations, according to the invention.

The device of FIG. 12 operates as follows. At first, preliminary adjustment of the optical systems 12 and 18 is performed to achieve complete agreement of the visible and invisible images of the treatment zone 2 in the work position. With the shutter 10 being left closed to intercept the invisible beam of the $CO_2$ laser 9, the workpiece is placed in the work position which is visualized by the spacially modulated beam 1 of visible laser radiation of the helium-neon laser 17. The accuracy of adjustment can be controlled by the physician through the ophtalmoscope 23. Then the shutter 10 is opened to expose briefly the object 5 which is the eye cornea of a patient. A computer-designed optical phase element 3 producing a cross-shaped spot of the laser beam 1 is used to correct myopia, while a phase element 3 producing an arc-shaped spot is used to remove a cataract.

This device can also be used for postoperative(laser therapy whereby dissected portions of the eye cornea are exposed to a laser beam 1 of the laser 17, which is spatially modulated by a respective optical phase element 3 in order to achieve faster healing process.

Apart from medical applications, the device may be used in industry, particularly when the treatment zone 2 is to be visually identified, for accuracy sake, by a light spot having a desired shape, e.g. for marking products.

EXAMPLE 3

One more industrial application of the laser treatment device shown in FIG. 11 is simultaneous piercing of shaped holes, e.g. square holes or groups of holes in ceramic boards for electronic microcircuits, where high-quality perforations are required. Multiple perforations in a ceramic workpiece 5 have to be made for several reasons: optical break-down of gases and evaporated material, hydrodynamic processes in the melt, effects of the cavity formed by the laser beam, and many other features of the material of the ceramic workpiece 5. The workpiece 5 in this case was a ceramic board, 1 mm thick. The zone of treatment was concentrated on the vertexes of a square.

The laser 9 generating invisible radiation was a $CO_2$ pulsed laser with a wavelength of 10.6 micrometers, a pulse duration $\tau \sim 10^{-4}$ s, and the energy of each pulse $E=2$ J. The laser 17 generating visible radiation was a ruby laser with a wavelength $\lambda = 0.69$ micrometers, a pulse duration $\tau \sim 10^{-3}$ s, a pulse energy $E=2$ J. The optical systems 12 and 18 were equipped with computer-designed optical phase elements 3 similarly focused to four points arranged in the vertexes of a square. At first, the treatment zone 2 was exposed to a pulse of the ruby laser 17 with a radiation density of $10^8$ J/m$^2$. This laser radiation produced a melt having a uniform depth in the treatment zone 2. Then the treatment zone 2 was exposed to a pulse of the $CO_2$ laser 9 ensuring evaporation and removal of the melt. In this manner, only two pulses were required to perforate four high-precision holes accurately spaced apart.

The device realizing this method of laser treatment can be made automatic. In this case, the device (FIG. 13) should comprise a computer 24 to control, in accordance with a desired program, the operation of basic units and mechanisms of the device. The source 8 comprises a laser 9 with a power supply unit $9^I$ and a shutter 10 equipped with an electrical control unit $10^I$ intended to control the exposure during laser treatment. The optical system 12 for delivering laser radiation to the workpiece 5 comprises a tilting mirror 21 and a computer-designed optical phase element 3 installed in a device 15 with a control unit $15^I$. In addition, the device also comprises a system 25 for supplying technological media to the treatment zone 2, and an observation system 26 intended for preliminary adjustment of the optical system 12 and monitoring the production process. The workpiece 5 is secured on a movable work table 13 equipped with a control unit $13^I$ to control its position. A temperature-sensitive transducer is secured to the workpiece 5 and connected to an instrument 27. The workpiece 5 can be placed on the work table by an operator or by a positioner-robot (not shown). The computer 24 is electrically connected to the power supply unit $9^I$ of the laser 9, to the control unit $10^I$ of the shutter 10, to the control unit $15^I$ of the positioning device 15 of the phase element 3, to the positioning unit $13^I$ of the work table 13, and to the manufacturing media supply system 25. In this manner the production process of laser treatment can be realized according to a program available in the computer 24.

The operator is to place and secure the workpiece 5 on the work table 13, start the device, and monitor the production process with the aid of the system 26 and the temperature with the aid of the instrument 27. The operator may also activate the system 25 for supply of a manufacturing medium, e.g. chemically active or inert gas, in accordance with the production process peculiarities.

EXAMPLE 4

The object 5 of treatment was a hollow cylinder with a 0.3 mm thick wall and an absorbing coating applied on the surface thereof. The treatment zone 2 was a straight line segment, not more than 2 mm wide. The laser 9 was a $CO_2$ continuous laser with a wavelength $\lambda = 10.6$ micrometers and output power of 0.9 kW. The laser beam 1 with a diameter of 40 mm had non-uniform distribution of intensity over the cross-section thereof. The optical system 12 was equipped with a reflecting computer-designed optical phase element 3 made as a 2 mm thick copper plate. This optical phase element 3 focused the laser beam to a straight line segment with a length of 10 mm. Simultaneously with the activation of the source 8, a flow of oxygen-containing gas mixture was supplied at a rate of 2 m$^3$/min. One exposure to the laser beam 1 with a density of $10^8$ W/m$^2$ was sufficient to perforate a slot measuring 1 by 10 mm. Then the workpiece 5 was turned with the work table 13 to a desired angle and exposed again. This slot piercing operation was repeated with each turn of the workpiece 5 along its circumference. Then the optical phase element 3 was shifted to a desired distance and slots were perforated along the next belt of the workpiece 5 and so on.

Slots were perforated in a checker-board order over the entire surface of the workpiece 5 so that its mechanical strength and rigidity was not affected. This operation was employed to manufacture tubular filters.

The laser treatment method proposed in this invention and the device realizing this method provide a combination of possible applications: treatment of the surface of a workpiece 5 in zones 2 having desired shapes; producing, in the zone 2, a desired distribution of laser power intensity during treatment of the workpiece 5; concentration of the laser beam power directed to the treatment zone 2; and delivery of the laser beam 1 to the workpiece 5 at a desired angle $\phi$ in conformity with the manufacturing requirements of the process of treatment of the workpiece 5.

Higher efficiency of laser treatment by the proposed method is achieved by employing a multiple-zone treatment process, reducing the length of the production process due to elimination of auxiliary operations, and utilizing high-speed production equipment.

The quality of the workpieces 5 has also been improved since it acquires a combination of manufacturing and operational properties characterized by high specific and fatigue strength and durability after this type of laser treatment by the device according to the invention.

The proposed method of laser treatment of objects and a device realizing this method may find extensive use in many fields of industry, for example, in metal treatment for local thermal hardening of workpiece surfaces, including hardening and doping, and for thermal weakening of workpiece surfaces followed by mechanical treatment (for example, bending and stamping of intricately shaped workpieces), for piercing group holes, welding, cutting of sheet materials, pipes and rods, for marking of workpieces made of fragile and high-strength materials.

This method can also be used for treatment of nonmetal materials and manufacturing of products from plastic and other polymer materials for stamping of intricately shaped workpieces and for finishing of holes to a specific shape and in the prescribed arrangement.

This method can be used in microelectronics and instrument making for treatment (cutting) of the surface layer of printed circuit boards and other elements of microcircuits to a specific depth and along a prescribed contour, for sintering of microoptic elements for fiber optical communication lines, for treatment of thin films for integrated circuits, for cutting and patterning of ceramic substrates of intricate shapes, for marking of products made of silicon, ceramic, and other hard and fragile materials, for finishing of groups of holes of specific shapes and arrangements.

In light industry, this method can be used for pattern cutting of leather materials, natural wooven fabrics and artificial ones, and, also, for manufacturing of punched cards.

This method can be used for manufacturing construction materials from ceramics, tufa, glass, and other hard and fragile materials, for treatment, by glass founding, of surfaces in accordance with specific patterns, for marking, for finishing of groups of holes of specific shape and arrangement.

In lithography, for manufacturing photographic masks.

Besides, the herein disclosed method and device can be used in medicine for surgical operations, for example, ophthalmological ones, and for therapeutical treatment.

We claim:

1. A device for laser treatment of an object, comprising a source of laser radiation, whose optical axis is used to arrange an optical system for delivering the laser radiation to the object, the optical system comprising at least one computer-synthesized optical phase element ensuring the turn of the beam, its spatial phase modulation, and redistribution of its intensity within the treatment zone, distribution of the laser radiation intensity, and the wavelength, the peaks of the micropattern having a height changing from the base to its top within the range from 0 to $\lambda/2$ for a reflection plate and from $\lambda/(n-1)$ for a transmitting plate, where n is a refractive index of the transmitting plate.

2. A device as claimed in claim 1, wherein the source of radiation is a source composed of two lasers, one emitting an invisible and the other a visible beam, a second optical system being arranged on the optical axis of the second laser to produce a visible image of the treatment zone having a desired shape and optically matched with the invisible image of the treatment zone.

3. A device as claimed in claim 1, further comprising a device for repositioning the computer-sythesized optical phase element in relation of the optical axis of the source.

4. A device as claimed in claim 2, further comprising a device for repositioning the computer-synthesized optical phase element in relation of the optical axis of the source.

5. A device as claimed in claim 1, wherein the optical system for delivering laser radiation to the object of treatment comprises a set of computer-synthesized phase elements secured in a mechanism for their shifting and positioning.

6. A device as claimed in claim 2, wherein the optical system for delivering laser radiation to the object of treatment comprises a set of computer-synthesized phase elements secured in a mechanism for their shifting and positioning.

* * * * *